3,471,494
2-CYANO-3-(3-PYRIDAZYLAMINO)ALKENOIC ACID ESTERS
Milton Wolf, West Chester, and James L. Diebold, Havertown, Pa., assignors to American Home Products Corporation, New York, N.Y., a corporation of Delaware
No Drawing. Filed Mar. 12, 1968, Ser. No. 712,366
Int. Cl. C07d 51/04
U.S. Cl. 260—250                                2 Claims

ABSTRACT OF THE DISCLOSURE

The invention is directed to 2-cyano-3-(3-pyridazylamino)alkenoic acid esters. The compounds are active as antidepressants, or psychic energizers, particularly shown in their antagonism of reserpine ptosis.

---

This invention relates to new and novel 2-cyano-3-(3-pyridazylamino)alkenoic acid esters and their derivatives.

The compounds within the purview of the present invention are exemplified by those having the following formula:

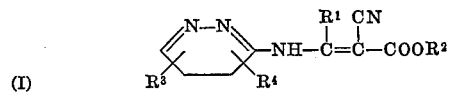

(I)

where $R^1$ is hydrogen or lower alkyl, preferably methyl or ethyl;

$R^2$ is lower alkyl, preferably ethyl;

$R^3$ and $R^4$ are hydrogen, lower alkyl, fluorine, chlorine, bromine, nitrile, lower alkoxy or lower alkylthio.

As used herein, the terms "lower alkyl," "lower alkoxy," "lower alkylthio," and the like, describe groups containing from one to about four carbon atoms.

A typical example of a compound of this invention is 2 - cyano - 3 - (3 - pyridazylamino)acrylic acid, ethyl ester.

The new and novel compounds of this invention may be prepared by the process which is hereinafter schematically illustrated:

Step A:

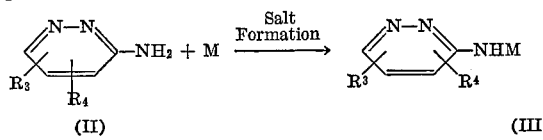

Step B:

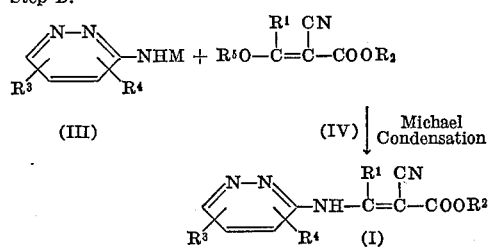

where $R^1$–$R^4$ are described above and $R^5$ is lower alkyl, preferably ethyl or methyl, with the proviso that $R^2$ and $R^5$ are the same. M is a metal, preferably an alkali metal, such as sodium or lithium.

The preparation of the 2-cyano-3-(3-pyridazylamino)alkenoic acid esters (I) is carried out in two steps. The first step comprises the conversion of a 3-amino-pyridazine to its corresponding alkali metal salt. The second step is a condensation of the 3-aminopyridazine salt with a 2-cyano-3-alkoxyalkenoic acid ester to form the compounds of this invention.

In the first step, step A, a 3-aminopyridazine (II) is added to a solution of a reactive metal, such as an alkali metal, for instance, sodium or lithium. A solution of sodium in absolute alkanol, such as methanol or ethanol is especially advantageous. The solution is heated at a temperature range from about 40° C. to about 80° C., preferably the reflux temperature for about five to about thirty minutes, preferably ten minutes, forming a 3-aminopyridazine salt intermediate (III) which is neither separated or recovered.

The second step, step B, is a Michael reaction, which may be described as a base-catalyzed condensation of an above-prepared 3-aminopyridazine salt (III) with an appropriate 2-cyano-3-alkoxyalkenoic acid ester (IV). In the second step, a 2-cyano-3-alkoxyalkenoic acid ester (IV) is added to the above-prepared 3-aminopyridazine salt-containing solution. The reaction mixture is then heated at a temperature range from about room temperature to about 80° C., preferably the reflux temperature, for a period of about ½ to about 2½ hours, preferably one hour. The resulting product is a 2-cyano-3-(3-pyridazylamino)alkenoic acid ester (I) which is separated by standard recovery procedures, for instance, by filtration, and recrystallized from an organic-aqueous solvent, such as alcohol-water, particularly ethanol-water, and dimethylformamide-water, and twice from an organic solvent, such as acetonitrile or ethyl acetate and cyclohexane.

The new and novel 2-cyano-3-(3-pyridazylamino)alkenoic acid esters of the present invention have utility in experimental and comparative pharmacology. In this regard, the compounds are antidepressants, or psychic energizers, which is demonstrated by their antagonism of reserpine ptosis.

In the pharmacological evaluation of the central nervous system activity of the compounds of this invention, the in vivo effects are tested as follows:

A compound to be tested is administered intraperitoneally to three mice (14 to 24 grams) at each of the following doses: 400, 127, 40 and 12.7 mg./kg. The animals are watched for a minimum of two hours during which time signs of general stimulation (i.e., increased spontaneous motor activity, hyperactivity on tactile stimulation, twitching) are noted.

The compounds of the present invention in the above test procedure induce antidepressant effects at the stated doses.

In the pharmacological evaluation of the antagonism to reserpine ptosis of the compounds of this invention, the in vivo effects are tested as follows. The compounds at graded dose levels are administered orally to groups of 6 mice (3 males and 3 females) at a number of dose levels. One hour later, the host animals are challenged with reserpine, 2.5 milligrams per kilogram of host body weight, administered intraperitoneally. The degree of ptosis for each eye is determined at one hour and two hours post-treatment. Prevention of ptosis if any is determined for each time period by comparison with control animals run simultaneously and calculated according to the following formula:

Percent antagonism =

$$\frac{\text{Average score (control)} - \text{average score (test)}}{\text{Average score (control)}} \times 100$$

The foregoing test is a test of the activity of the compounds of the invention as stimulants and psychic energizers. The test is described in the literature, for instance in Rubin et al. J.P.E.T. 120: 125 (1957).

The compounds of the present invention in the above test procedure were shown to be antagonistic to reserpine ptosis at 100 to 200 milligrams per kilogram of body weight of the host. The dose range was effective for fifty percent of the test animals ($ED_{50}$).

When the compounds of this invention are employed as described above, they may be administered alone or in combination with pharmacologically acceptable carriers, the proportion of which is determined by the solubility and chemical nature of the compound, chosen route of administration and standard pharmacological practice. For example, they may be administered orally in the form of tablets or capsules containing such excipients as starch, milk, sugar, certain types of clay and so forth. They may be administered sublingually in the form of troches or lozenges in which the active ingredient is mixed with sugar and corn syrups, and then dehydrated sufficiently to make it suitable for pressing into a solid form. They may be administered orally in the form of solutions which may contain coloring and flavoring agents or they may be injected parenterally, that is intramuscularly, intravenously or subcutaneously. For parenteral administration they may be used in the form of a sterile solution containing other solutes, for example, enough saline or glucose to make the solution isotonic.

The dosage of the present therapeutic agents will vary with the form of administration and the particular compound chosen. Furthermore, it will vary with the particular subject under treatment. Generally, treatment is initiated with small dosages substantially less than the optimum dose of the compound. Thereafter, the dosage is increased by small increments until the optimum effect under the circumstances is reached. It will generally be found that when the composition is administered orally, larger quantities of the active agent will be required to produce the same effect as a smaller quantity given parenterally. In general, the compounds of this invention are most desirably administered at a concentration level that will generally afford effective results without causing any harmful or deleterious side effects.

In order more clearly to disclose the nature of the present invention, specific examples of the practice of the invention are hereinafter given. It should be understood, however, that this is done solely by way of example and is intended neither to delineate the scope of the invention nor limit the ambit of the appended claims.

EXAMPLE I

A compound of the present invention is prepared by adding 8.0 grams (g.) (equivalent to 0.84 mole) of 3-aminopyridazine to a solution of 1.92 grams (0.84 gram atomic weight) of sodium in 70 milliliters (ml.) of absolute ethanol. After heating at the reflux temperature for 10 minutes, 14.1 g. (0.084 m.) of 2-cyano-3-ethoxyacrylic acid, ethyl ester is added, and the heterogeneous reaction mixture is refluxed for two and one-half hours.

The solid product is collected by filtration and recrystallized once from ethanol-water and twice from acetonitrile affording 4.0 grams, a 21.8 percent yield, of colorless crystal having a melting point of 193–194° C. The product is 2-cyano-3-(3-pyridazylamino)acrylic acid, ethyl ester.

Based on the formula $C_{10}H_{10}N_4O_2$, it is calculated that the elemental analysis by weight will be 55.04 percent carbon, 4.62 percent hydrogen, and 25.68 percent nitrogen. The product is analyzed, and the content is found to be 55.16 percent carbon, 4.71 percent hydrogen and 25.80 percent nitrogen. The foregoing may be expressed:

*Analysis.*—Calculated for $C_{10}H_{10}N_4O_2$: C, 55.04; H, 4.62; N, 25.68. Found: C, 55.16; H, 4.71; N, 25.80.

EXAMPLES II–V

Proceeding as described in Example I and substituting the following starting compounds for 3-aminopyridazine, the following products are afforded:

| Example | Starting compound | Product |
|---|---|---|
| II | 3-amino-6-methoxypyridazine. | 2-cyano-3-(6-methoxy-3-pyridazinylamino) acrylic acid, ethyl ester. |
| III | 3-amino-6-chloro-5-methylpyridazine. | 2-cyano-3-(6-chloro-5-methyl-3-pyridazinylamino) acrylic acid, ethyl ester. |
| IV | 3-amino-6-butylthio-pyridazine. | 2-cyano-3-(6-butyl-thio-3-pyridazinyl-amino) acrylic acid, ethyl ester. |
| V | 3-amino-6-fluoropyridazine. | 2-cyano-3-(6-fluoro-3-pyridazinylamino) acrylic acid, ethyl ester. |

EXAMPLE VI

A compound of the present invention is prepared by adding 0.84 mole of 3-amino-6-methoxypyridazine to a solution of 0.84 gram atomic weight of sodium in 70 ml. of absolute methanol. After heating at the reflux temperature for 10 minutes 0.084 m. 2-cyano-3-butoxyacrylic acid, butyl ester is added, and the heterogeneous reaction mixture is refluxed for two and one-half hours.

The solid product is collected by filtration and recrystallized once from ethanol-water and twice from acetonitrile affording 2-cyano-3-(6-methoxy-3-pyridazinylamino) acrylic acid, butyl ester.

EXAMPLES VII–IX

Proceeding as described in Example VI and substituting the following starting compounds for 3-aminopyridazine the following products are afforded:

| Example | Starting compound | Product |
|---|---|---|
| VII | 3-amino-6-ethoxypyridazine. | 2-cyano-3-(6-ethoxy-3-pyridazinylamino) acrylic acid, butyl ester. |
| VIII | 3-amino-6-methylthio-pyridazine. | 2-cyano-3-(6-methyl-thio-3-pyridazinylamino) acrylic acid, butyl ester. |
| IX | 3-amino-6-chloropyridazine. | 2-cyano-3-(6-chloro-3-pyridazinylamino) acrylic acid, butyl ester. |

EXAMPLE X

A compound of the present invention is prepared by adding 0.84 mole of 3-amino-6-fluoro-pyridazine to a solution of 0.84 gram atomic weight of lithium in 70 ml. of absolute ethanol. After heating at the reflux temperature for 10 minutes 0.084 m. of 2-cyano-3-propoxyacrylic acid, propyl ester is added, and the heterogeneous reaction mixture is refluxed for two and one-half hours.

The solid product is collected by filtration and recrystallized once from ethanol-water and twice from acetonitrile affording 2-cyano-3-(6-fluoro-3-pyridazinylamino)acrylic acid, propyl ester.

EXAMPLES XI–XVII

Proceeding as described in Example X and substituting the following starting compounds for 3-aminopyridazine the following products are afforded:

| Example | Starting compound | Product |
|---|---|---|
| XI | 3-amino-6-butoxypyridazine | 2-cyano-3-(6-butoxy-3-pyridazinylamino) acrylic acid, propyl ester. |
| XII | 3-amino-6-ethylthiopyridazine. | 2-cyano-3-(6-ethylthio-3-pyridazinylamino)acrylic acid, propyl ester. |
| XIII | 3-amino-6-bromopyridazine | 2-cyano-3-(6-bromo-3-pyridazinylamino) acrylic acid, propyl ester. |
| XIV | 3-amino-6-chloropyridazine | 2-cyano-3-(6-chloro-3-pyridazinylamino) acrylic acid, propyl ester. |
| XV | 3-amino-4,5-dimethylpyridazine. | 2-cyano-3-(4,5-dimethyl-3-pyridazinylamino) acrylic acid, propyl ester. |
| XVI | 3-amino-4-butyl-6-methylpyridazine. | 3-(4-butyl-6-methyl-3-pyridazinylamino)-2-cyano-acrylic acid, propyl ester. |
| XVII | 3-amino-4-ethyl-6-nitrilepyridazine. | 2-cyano-3-(4-ethyl-6-nitrile-3-pyridazinylamino)-acrylic acid, propyl ester. |

EXAMPLE XVIII

A compound of the present invention is prepared by adding 0.84 mole of 3-aminopyridazine to a solution of 0.84 gram atomic weight of sodium in 70 ml. of absolute ethanol. After heating at 40° C. for 80 minutes 0.84 mole of 2-cyano-3-methoxyacrylic acid, methyl ester is added and the heterogeneous reaction mixture is refluxed for two and one-half hours.

The solid product is collected by filtration and recrystallized once from ethanol-water and twice from acetonitrile affording 2-cyano-3-(3-pyridazylamino) acrylic acid, methyl ester.

EXAMPLES XIX–XXIV

Proceeding as described in Example XVIII and substituting the following starting compounds for 3-aminopyridazine, the following products are afforded:

| Example | Starting material | Product |
|---|---|---|
| XIX | 2-cyano-3-methoxyacrylic acid, methyl ester. | 2-cyano-3-(3-pyridazylamino)acrylic acid, methyl ester. |
| XX | 3-butoxy-2-cyanoacrylic acid, butyl ester. | 2-cyano-3-(3-pyridazylamino)acrylic acid, butyl ester. |
| XXI | 2-cyano-3-ethoxycrotonic acid, ethyl ester. | 2-cyano-3-(3-pyridazylamino)crotonic acid, ethyl ester. |
| XXII | 2-cyano-3-ethoxypentenoic acid, ethyl ester. | 2-cyano-3-(3-pyridazylamino)pentenoic acid, ethyl ester. |
| XXIII | 2-cyano-3-ethoxyhexenoic acid, ethyl ester. | 2-cyano-3-(3-pyridazylamino)hexenoic acid, ethyl ester. |
| XXIV | 2-cyano-3-ethoxyheptenoic acid, ethyl ester. | 2-cyano-3-(3-pyridazylamino)heptenoic acid ethyl ester. |

EXAMPLES XXV–XXXV

Proceeding as described in Example I but substituting the following starting materials, the following products are obtained:

| Example | Starting compounds | Product |
|---|---|---|
| XXV | 3-amino-6-methoxypyridazine and 2-cyano-3-ethoxycrotonic acid, ethyl ester. | 2-cyano-3-(6-methoxy-3-pyridazinylamino) crotonic acid, ethyl ester. |
| XXVI | 3-amino-6-ethoxypyridazine and 2-cyano-3-propoxypentenoic acid, propyl ester. | 2-cyano-3-(6-ethoxypyridazinylamino)pentenoic acid, propyl ester. |
| XXVII | 3-amino-6-butoxypyridazine and 2-cyano-3-butoxyhexenoic acid, butyl ester. | 2-cyano-3-(6-butoxy-3-pyridazinylamino)hexenoic acid, butyl ester. |
| XXVIII | 3-amino-6-chloro-5-methyl-pyridazine and 2-cyano-3-methoxyheptenoic acid, methyl ester. | 2-cyano-3-(6-chloro-5-methyl-3-pyridazinylamino) heptenoic acid, methyl ester. |
| XXIX | 3-amino-6-methylthiopyridazine and 2-cyano-2-butoxycrotonic acid, butyl ester. | 2-cyano-3-(6-methylthio-3-pyridazinylamino) crotonic acid, butyl ester. |
| XXX | 3-amino-6-ethylthiopyridazine and 2-cyano-3-ethoxyheptenoic acid, ethyl ester. | 2-cyano-3-(6-ethylthio-3-pyridazinylamino)heptenoic acid, ethyl ester. |
| XXXI | 3-amino-6-butylthiopyridazine and 2-cyano-3-butoxypentenoic acid, butyl ester. | 2-cyano-3-(6-butylthio-3-pyridazinylamino)pentenoic acid, butyl ester. |
| XXXII | 3-amino-6-bromopyridazine and 2-cyano-3-propoxyhexenoic acid, propyl ester. | 2-cyano-3-(6-bromo-3-pyridazinylamino)hexenoic acid, propyl ester. |
| XXXIII | 3-amino-6-chloropyridazine and 2-cyano-3-methoxycrotonic acid, methyl ester. | 2-cyano-3-(6-chloro-3-pyridazinylamino)crotonic acid, methyl ester. |
| XXXIV | 3-amino-6-fluoropyridazine and 2-cyano-3-butoxyheptenoic acid, butyl ester. | 2-cyano-3-(6-fluoro-3-pyridazinylamino)heptenoic acid, butyl ester. |
| XXXV | 3-amino-6-bromopyridazine and 2-cyano-3-ethoxypentenoic acid, ethyl ester. | 2-cyano-3-(6-bromo-3-pyridazinylamino)pentenoic acid, ethyl ester. |

What is claimed is:
1. The compounds having the formula

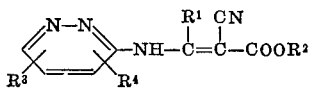

where

R$^1$ is selected from the class consisting of hydrogen and lower alkyl;

R$^2$ is lower alkyl; and

R$^3$ and R$^4$ are selected from the class consisting of hydrogen, lower alkyl, fluorine, chlorine, bromine, nitrile lower alkoxy and lower alkylthio.

2. 2-cyano-3 - (3 - pyridazylamino)acrylic acid, ethyl ester.

No references cited.

NICHOLAS S. RIZZO, Primary Examiner

U.S. Cl. X.R.
424—250